US007962642B2

(12) United States Patent
Ignatius et al.

(10) Patent No.: US 7,962,642 B2
(45) Date of Patent: Jun. 14, 2011

(54) PIPELINE SYSTEMS AND METHOD FOR TRANSFERRING DATA IN A NETWORK ENVIRONMENT

(75) Inventors: Paul Ignatius, Ocean, NJ (US); Anand Prahlad, Ocean, NJ (US); Mahesh Tyagarajan, San Jose, CA (US)

(73) Assignee: CommVault Systems, Inc., Oceanport, NJ (US)

( * ) Notice: Subject to any disclaimer, the term of this patent is extended or adjusted under 35 U.S.C. 154(b) by 432 days.

(21) Appl. No.: 12/147,066

(22) Filed: Jun. 26, 2008

(65) Prior Publication Data

US 2008/0256173 A1    Oct. 16, 2008

Related U.S. Application Data

(63) Continuation of application No. 10/144,683, filed on May 13, 2002, now Pat. No. 7,401,154, which is a continuation of application No. 09/038,440, filed on Mar. 11, 1998, now Pat. No. 6,418,478.

(60) Provisional application No. 60/063,831, filed on Oct. 30, 1997.

(51) Int. Cl.
*G06F 15/16* (2006.01)
*G06F 15/177* (2006.01)
(52) U.S. Cl. .................... 709/232; 709/220; 709/227
(58) Field of Classification Search .................... 709/202
See application file for complete search history.

(56) References Cited

U.S. PATENT DOCUMENTS

| 4,296,465 A | 10/1981 | Lemak |
| 4,686,620 A | 8/1987 | Ng |
| 4,695,943 A * | 9/1987 | Keeley et al. ................. 711/140 |
| 4,995,035 A | 2/1991 | Cole et al. |
| 5,005,122 A | 4/1991 | Griffin et al. |
| 5,062,104 A | 10/1991 | Lubarsky et al. |

(Continued)

FOREIGN PATENT DOCUMENTS

EP    0 259 912    3/1988

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner* — Aaron Strange
*Assistant Examiner* — James Edwards
(74) *Attorney, Agent, or Firm* — Knobbe, Martens, Olson & Bear, LLP

(57) ABSTRACT

A communications system having a data transfer pipeline apparatus for transferring data in a sequence of N stages from an origination device to a destination device. The apparatus comprises dedicated memory having buffers dedicated for carrying data and a master control for registering and controlling processes associated with the apparatus for participation in the N stage data transfer sequence. The processes include a first stage process for initiating the data transfer and a last Nth stage process for completing data transfer. The first stage process allocates a buffer from a predetermined number of buffers available within the memory for collection, processing, and sending of the data from the origination device to a next stage process. The Nth stage process receives a buffer allocated to the first stage process from the (N−1)th stage and to free the buffer upon processing completion to permit reallocation of the buffer.

20 Claims, 11 Drawing Sheets

U.S. PATENT DOCUMENTS

| | | | |
|---|---|---|---|
| 5,093,912 A | 3/1992 | Dong et al. | |
| 5,133,065 A | 7/1992 | Cheffetz et al. | |
| 5,150,469 A * | 9/1992 | Jouppi | 712/244 |
| 5,163,131 A * | 11/1992 | Row et al. | 709/202 |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,247,616 A * | 9/1993 | Berggren et al. | 709/212 |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,351 A | 4/1994 | Jippo | |
| 5,311,509 A * | 5/1994 | Heddes et al. | 370/397 |
| 5,321,816 A | 6/1994 | Rogan et al. | |
| 5,333,315 A | 7/1994 | Saether et al. | |
| 5,347,653 A | 9/1994 | Flynn et al. | |
| 5,377,341 A * | 12/1994 | Kaneko et al. | 711/169 |
| 5,388,243 A | 2/1995 | Glider et al. | |
| 5,410,700 A | 4/1995 | Fecteau et al. | |
| 5,428,783 A * | 6/1995 | Lake | 718/106 |
| 5,448,724 A | 9/1995 | Hayashi et al. | |
| 5,465,359 A | 11/1995 | Allen et al. | |
| 5,487,160 A | 1/1996 | Bemis | |
| 5,491,810 A | 2/1996 | Allen | |
| 5,495,607 A | 2/1996 | Pisello et al. | |
| 5,504,873 A | 4/1996 | Martin et al. | |
| 5,515,502 A | 5/1996 | Wood | |
| 5,544,345 A | 8/1996 | Carpenter et al. | |
| 5,544,347 A | 8/1996 | Yanai et al. | |
| 5,555,404 A | 9/1996 | Torbjornsen et al. | |
| 5,559,957 A | 9/1996 | Balk | |
| 5,559,991 A | 9/1996 | Kanfi | |
| 5,588,117 A * | 12/1996 | Karp et al. | 709/232 |
| 5,592,618 A | 1/1997 | Micka et al. | |
| 5,598,546 A | 1/1997 | Blomgren | |
| 5,606,359 A | 2/1997 | Youden et al. | |
| 5,615,392 A | 3/1997 | Harrison et al. | |
| 5,619,644 A | 4/1997 | Crockett et al. | |
| 5,638,509 A | 6/1997 | Dunphy et al. | |
| 5,642,496 A | 6/1997 | Kanfi | |
| 5,644,779 A * | 7/1997 | Song | 712/23 |
| 5,651,002 A * | 7/1997 | Van Seters et al. | 370/392 |
| 5,673,381 A | 9/1997 | Huai et al. | |
| 5,675,511 A | 10/1997 | Prasad et al. | |
| 5,680,550 A | 10/1997 | Kuszmaul et al. | |
| 5,682,513 A | 10/1997 | Candelaria et al. | |
| 5,687,343 A | 11/1997 | Fecteau et al. | |
| 5,699,361 A | 12/1997 | Ding et al. | |
| 5,719,786 A | 2/1998 | Nelson et al. | |
| 5,729,743 A | 3/1998 | Squibb | |
| 5,737,747 A | 4/1998 | Vishlitsky et al. | |
| 5,751,997 A | 5/1998 | Kullick et al. | |
| 5,758,359 A | 5/1998 | Saxon | |
| 5,761,104 A * | 6/1998 | Lloyd et al. | 708/517 |
| 5,761,677 A | 6/1998 | Senator et al. | |
| 5,761,734 A | 6/1998 | Pfeffer et al. | |
| 5,764,972 A | 6/1998 | Crouse et al. | |
| 5,771,391 A * | 6/1998 | Lloyd et al. | 712/1 |
| 5,778,395 A | 7/1998 | Whiting et al. | |
| 5,784,589 A * | 7/1998 | Bluhm | 712/217 |
| 5,790,828 A | 8/1998 | Jost | |
| 5,805,920 A | 9/1998 | Sprenkle et al. | |
| 5,812,398 A | 9/1998 | Nielsen | |
| 5,813,008 A | 9/1998 | Benson et al. | |
| 5,813,009 A | 9/1998 | Johnson et al. | |
| 5,813,017 A | 9/1998 | Morris | |
| 5,815,462 A * | 9/1998 | Konishi et al. | 365/233.11 |
| 5,829,023 A | 10/1998 | Bishop | |
| 5,829,046 A | 10/1998 | Tzelnic et al. | |
| 5,860,104 A | 1/1999 | Witt et al. | |
| 5,875,478 A | 2/1999 | Blumenau | |
| 5,875,481 A | 2/1999 | Ashton et al. | |
| 5,878,056 A * | 3/1999 | Black et al. | 714/748 |
| 5,887,134 A | 3/1999 | Ebrahim | |
| 5,890,159 A | 3/1999 | Sealby et al. | |
| 5,897,643 A | 4/1999 | Matsumoto | |
| 5,901,327 A | 5/1999 | Ofek | |
| 5,924,102 A | 7/1999 | Perks | |
| 5,926,836 A | 7/1999 | Blumenau | |
| 5,933,104 A | 8/1999 | Kimura | |
| 5,936,871 A * | 8/1999 | Pan et al. | 708/517 |
| 5,950,205 A | 9/1999 | Aviani, Jr. | |
| 5,956,519 A * | 9/1999 | Wise et al. | 712/16 |
| 5,958,005 A | 9/1999 | Thorne et al. | |
| 5,958,043 A * | 9/1999 | Motomura | 712/216 |
| 5,970,233 A | 10/1999 | Liu et al. | |
| 5,970,255 A | 10/1999 | Tran et al. | |
| 5,974,563 A | 10/1999 | Beeler, Jr. | |
| 5,987,478 A | 11/1999 | See et al. | |
| 5,995,091 A | 11/1999 | Near et al. | |
| 5,999,629 A | 12/1999 | Heer et al. | |
| 6,003,089 A | 12/1999 | Shaffer et al. | |
| 6,009,274 A | 12/1999 | Fletcher et al. | |
| 6,012,090 A | 1/2000 | Chung et al. | |
| 6,021,415 A | 2/2000 | Cannon et al. | |
| 6,026,414 A | 2/2000 | Anglin | |
| 6,041,334 A | 3/2000 | Cannon | |
| 6,052,735 A | 4/2000 | Ulrich et al. | |
| 6,058,494 A | 5/2000 | Gold et al. | |
| 6,076,148 A | 6/2000 | Kedem et al. | |
| 6,094,416 A | 7/2000 | Ying | |
| 6,094,684 A | 7/2000 | Pallmann | |
| 6,101,255 A * | 8/2000 | Harrison et al. | 380/52 |
| 6,105,129 A | 8/2000 | Meier et al. | |
| 6,105,150 A | 8/2000 | Noguchi et al. | |
| 6,112,239 A | 8/2000 | Kenner et al. | |
| 6,122,668 A | 9/2000 | Teng et al. | |
| 6,131,095 A | 10/2000 | Low et al. | |
| 6,131,190 A | 10/2000 | Sidwell | |
| 6,137,864 A | 10/2000 | Yaker | |
| 6,148,412 A | 11/2000 | Cannon et al. | |
| 6,154,787 A | 11/2000 | Urevig et al. | |
| 6,154,852 A | 11/2000 | Amundson et al. | |
| 6,161,111 A | 12/2000 | Mutalik et al. | |
| 6,167,402 A | 12/2000 | Yeager | |
| 6,175,829 B1 | 1/2001 | Li et al. | |
| 6,212,512 B1 | 4/2001 | Barney et al. | |
| 6,230,164 B1 | 5/2001 | Rikieta et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,292,783 B1 | 9/2001 | Rohler | |
| 6,295,541 B1 | 9/2001 | Bodnar et al. | |
| 6,301,592 B1 | 10/2001 | Aoyama et al. | |
| 6,304,880 B1 | 10/2001 | Kishi | |
| 6,324,581 B1 | 11/2001 | Xu et al. | |
| 6,328,766 B1 | 12/2001 | Long | |
| 6,330,570 B1 | 12/2001 | Crighton et al. | |
| 6,330,572 B1 | 12/2001 | Sitka | |
| 6,330,642 B1 | 12/2001 | Carteau | |
| 6,343,324 B1 | 1/2002 | Hubis et al. | |
| 6,350,199 B1 | 2/2002 | Williams et al. | |
| RE37,601 E | 3/2002 | Eastridge et al. | |
| 6,353,878 B1 | 3/2002 | Dunham | |
| 6,356,801 B1 | 3/2002 | Goodman et al. | |
| 6,374,266 B1 | 4/2002 | Shnelvar | |
| 6,374,336 B1 | 4/2002 | Peters et al. | |
| 6,381,331 B1 | 4/2002 | Kato | |
| 6,385,673 B1 | 5/2002 | DeMoney | |
| 6,389,432 B1 | 5/2002 | Pothapragada et al. | |
| 6,418,478 B1 | 7/2002 | Ignatius et al. | |
| 6,421,711 B1 | 7/2002 | Blumenau et al. | |
| 6,438,586 B1 | 8/2002 | Hass et al. | |
| 6,487,561 B1 | 11/2002 | Ofek et al. | |
| 6,487,644 B1 | 11/2002 | Huebsch et al. | |
| 6,505,307 B1 | 1/2003 | Stell et al. | |
| 6,519,679 B2 | 2/2003 | Devireddy et al. | |
| 6,538,669 B1 | 3/2003 | Lagueux, Jr. et al. | |
| 6,542,909 B1 | 4/2003 | Tamer et al. | |
| 6,542,972 B2 | 4/2003 | Ignatius et al. | |
| 6,564,228 B1 | 5/2003 | O'Connor | |
| 6,571,310 B1 | 5/2003 | Ottesen | |
| 6,577,734 B1 * | 6/2003 | Etzel et al. | 380/277 |
| 6,581,143 B2 | 6/2003 | Gagne et al. | |

| | | | | | | |
|---|---|---|---|---|---|---|
| 6,604,149 B1 | 8/2003 | Deo et al. | | 7,765,369 B1 | 7/2010 | Prahlad et al. |
| 6,631,442 B1 | 10/2003 | Blumenau | | 7,809,914 B2 | 10/2010 | Kottomtharayil et al. |
| 6,631,493 B2 | 10/2003 | Ottesen et al. | | 7,831,553 B2 | 11/2010 | Prahlad et al. |
| 6,647,396 B2 | 11/2003 | Parnell et al. | | 7,840,537 B2 | 11/2010 | Gokhale et al. |
| 6,654,825 B2 | 11/2003 | Clapp et al. | | 2002/0004883 A1 | 1/2002 | Nguyen et al. |
| 6,658,436 B2 | 12/2003 | Oshinsky et al. | | 2002/0029281 A1 | 3/2002 | Zeidner et al. |
| 6,658,526 B2 | 12/2003 | Nguyen et al. | | 2002/0040405 A1 | 4/2002 | Gold |
| 6,675,177 B1 | 1/2004 | Webb | | 2002/0042869 A1 | 4/2002 | Tate et al. |
| 6,732,124 B1 | 5/2004 | Michihiko et al. | | 2002/0042882 A1 | 4/2002 | Dervan et al. |
| 6,742,092 B1 | 5/2004 | Huebsch et al. | | 2002/0049778 A1 | 4/2002 | Bell et al. |
| 6,757,794 B1 | 6/2004 | Cabrera et al. | | 2002/0065967 A1* | 5/2002 | MacWilliams et al. ........ 710/105 |
| 6,763,351 B1 | 7/2004 | Subramaniam et al. | | 2002/0069369 A1 | 6/2002 | Tremain |
| 6,772,332 B1* | 8/2004 | Boebert et al. ................ 713/153 | | 2002/0107877 A1 | 8/2002 | Whiting et al. |
| 6,785,786 B1 | 8/2004 | Gold et al. | | 2002/0188691 A1 | 12/2002 | Ignatius et al. |
| 6,789,161 B1 | 9/2004 | Blendermann et al. | | 2002/0194340 A1 | 12/2002 | Ebstyne et al. |
| 6,791,910 B1 | 9/2004 | James et al. | | 2002/0198983 A1 | 12/2002 | Ullmann et al. |
| 6,859,758 B1 | 2/2005 | Prabhakaran et al. | | 2003/0014433 A1 | 1/2003 | Teloh et al. |
| 6,871,163 B2 | 3/2005 | Hiller et al. | | 2003/0016609 A1 | 1/2003 | Rushton et al. |
| 6,880,052 B2 | 4/2005 | Lubbers et al. | | 2003/0061491 A1 | 3/2003 | Jaskiewicz et al. |
| 6,886,020 B1 | 4/2005 | Zahavi et al. | | 2003/0066070 A1* | 4/2003 | Houston ........................... 725/9 |
| 6,909,722 B1 | 6/2005 | Li | | 2003/0079112 A1* | 4/2003 | Sachs et al. .................... 712/203 |
| 6,928,513 B2 | 8/2005 | Lubbers et al. | | 2003/0169733 A1 | 9/2003 | Gurkowski et al. |
| 6,952,758 B2 | 10/2005 | Chron et al. | | 2004/0010487 A1 | 1/2004 | Prahlad et al. |
| 6,965,968 B1 | 11/2005 | Touboul et al. | | 2004/0073716 A1 | 4/2004 | Boom et al. |
| 6,968,351 B2 | 11/2005 | Butterworth | | 2004/0088432 A1 | 5/2004 | Hubbard et al. |
| 6,973,553 B1 | 12/2005 | Archibald, Jr. et al. | | 2004/0107199 A1 | 6/2004 | Dairymple et al. |
| 6,983,351 B2 | 1/2006 | Gibble et al. | | 2004/0193953 A1 | 9/2004 | Callahan et al. |
| 7,003,519 B1 | 2/2006 | Biettron et al. | | 2004/0210796 A1 | 10/2004 | Largman et al. |
| 7,003,641 B2 | 2/2006 | Prahlad et al. | | 2004/0230829 A1 | 11/2004 | Dogan et al. |
| 7,035,880 B1 | 4/2006 | Crescenti et al. | | 2005/0033756 A1 | 2/2005 | Kottomtharayil et al. |
| 7,062,761 B2 | 6/2006 | Slavin et al. | | 2005/0033800 A1 | 2/2005 | Kavuri et al. |
| 7,069,380 B2 | 6/2006 | Ogawa et al. | | 2005/0044114 A1 | 2/2005 | Kottomtharayil et al. |
| 7,085,904 B2 | 8/2006 | Mizuno et al. | | 2005/0114406 A1 | 5/2005 | Dhrubajyoti et al. |
| 7,103,731 B2 | 9/2006 | Gibble et al. | | 2005/0166011 A1 | 7/2005 | Burnett et al. |
| 7,103,740 B1 | 9/2006 | Colgrove et al. | | 2005/0172093 A1 | 8/2005 | Jain |
| 7,107,298 B2 | 9/2006 | Prahlad et al. | | 2005/0246510 A1 | 11/2005 | Retnamma et al. |
| 7,107,395 B1 | 9/2006 | Ofek et al. | | 2005/0246568 A1 | 11/2005 | Davies |
| 7,117,246 B2 | 10/2006 | Christenson et al. | | 2005/0256972 A1 | 11/2005 | Cochran et al. |
| 7,120,757 B2 | 10/2006 | Tsuge | | 2005/0262296 A1 | 11/2005 | Peake |
| 7,130,970 B2 | 10/2006 | Devassy et al. | | 2005/0268068 A1 | 12/2005 | Ignatius et al. |
| 7,155,465 B2 | 12/2006 | Lee et al. | | 2006/0005048 A1 | 1/2006 | Osaki et al. |
| 7,155,633 B2 | 12/2006 | Tuma et al. | | 2006/0010154 A1 | 1/2006 | Prahlad et al. |
| 7,159,110 B2 | 1/2007 | Douceur et al. | | 2006/0010227 A1 | 1/2006 | Atluri |
| 7,174,433 B2 | 2/2007 | Kottomtharayil et al. | | 2006/0044674 A1 | 3/2006 | Martin et al. |
| 7,209,972 B1 | 4/2007 | Ignatius et al. | | 2006/0129768 A1 | 6/2006 | Pferdekaemper et al. |
| 7,246,140 B2 | 7/2007 | Therrien et al. | | 2006/0149889 A1 | 7/2006 | Sikha |
| 7,246,207 B2 | 7/2007 | Kottomtharayil et al. | | 2006/0224846 A1 | 10/2006 | Amarendran et al. |
| 7,246,272 B2 | 7/2007 | Cabezas et al. | | 2007/0288536 A1 | 12/2007 | Sen et al. |
| 7,269,612 B2 | 9/2007 | Devarakonda et al. | | 2008/0059515 A1 | 3/2008 | Fulton |
| 7,277,941 B2 | 10/2007 | Ignatius et al. | | 2008/0091894 A1 | 4/2008 | Retnamma et al. |
| 7,278,142 B2 | 10/2007 | Bandhole et al. | | 2008/0229037 A1 | 9/2008 | Bunte et al. |
| 7,287,047 B2 | 10/2007 | Kavuri | | 2008/0243914 A1 | 10/2008 | Prahlad et al. |
| 7,287,252 B2 | 10/2007 | Bussiere et al. | | 2008/0243957 A1 | 10/2008 | Prahlad et al. |
| 7,293,133 B1 | 11/2007 | Colgrove et al. | | 2008/0243958 A1 | 10/2008 | Prahlad et al. |
| 7,298,846 B2 | 11/2007 | Bacon et al. | | 2008/0256173 A1 | 10/2008 | Ignatius et al. |
| 7,315,923 B2 | 1/2008 | Retnamma | | 2009/0319534 A1 | 12/2009 | Gokhale |
| 7,346,623 B2 | 3/2008 | Prahlad et al. | | 2009/0319585 A1 | 12/2009 | Gokhale |
| 7,359,917 B2 | 4/2008 | Winter et al. | | 2010/0005259 A1 | 1/2010 | Prahlad |
| 7,380,072 B2 | 5/2008 | Kottomtharayil et al. | | 2010/0131461 A1 | 5/2010 | Prahlad et al. |
| 7,398,429 B2 | 7/2008 | Shaffer et al. | | | | |
| 7,401,154 B2 | 7/2008 | Ignatius et al. | | | FOREIGN PATENT DOCUMENTS | |
| 7,409,509 B2 | 8/2008 | Devassy et al. | | EP | 0 405 926 | 1/1991 |
| 7,467,167 B2 | 12/2008 | Patterson | | EP | 0 467 546 | 1/1992 |
| 7,472,238 B1 | 12/2008 | Gokhale | | EP | 0 774 715 | 5/1997 |
| 7,484,054 B2 | 1/2009 | Kottomtharayil et al. | | EP | 0 809 184 | 11/1997 |
| 7,490,207 B2 | 2/2009 | Amarendran | | EP | 0 862 304 | 9/1998 |
| 7,500,053 B1 | 3/2009 | Kavuri et al. | | EP | 0 899 662 | 3/1999 |
| 7,500,150 B2 | 3/2009 | Sharma et al. | | EP | 0 981 090 | 2/2000 |
| 7,509,019 B2 | 3/2009 | Kaku | | EP | 1174795 | 1/2002 |
| 7,519,726 B2 | 4/2009 | Palliyll et al. | | EP | 1115064 | 12/2004 |
| 7,529,748 B2 | 5/2009 | Wen et al. | | GB | 2366048 | 2/2002 |
| 7,536,291 B1 | 5/2009 | Retnamma et al. | | WO | WO 95/13580 | 5/1995 |
| 7,546,482 B2 | 6/2009 | Blumenau et al. | | WO | WO 98/39707 | 9/1998 |
| 7,581,077 B2 | 8/2009 | Ignatius et al. | | WO | WO 98/39709 | 9/1998 |
| 7,596,586 B2 | 9/2009 | Gokhale et al. | | WO | WO 99/12098 | 3/1999 |
| 7,613,748 B2 | 11/2009 | Brockway et al. | | WO | WO 99/14692 | 3/1999 |
| 7,627,598 B1 | 12/2009 | Burke | | WO | WO 99/17204 | 4/1999 |
| 7,627,617 B2 | 12/2009 | Kavuri et al. | | WO | WO 2004/090788 | 10/2004 |
| 7,685,126 B2 | 3/2010 | Patel et al. | | WO | WO 2005/055093 | 6/2005 |

OTHER PUBLICATIONS

Arneson, "Mass Storage Archiving in Network Environments," Digest of Papers, Ninth IEEE Symposium on Mass Storage Systems, Oct. 31-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5-9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

Arneson, David A., Control Data Corporation, *Development of Omniserver*; Mass Storage Systems, 1990, pp. 88-93.

U.S. Appl. No. 11/269,513, filed Nov. 7, 2005, Prahlad, et al.

U.S. Appl. No. 11/269,520, filed Nov. 7, 2005, Gokhale, et al.

Ashton, et al., "Two Decades of policy-based storage management for the IBM mainframe computer", www.research.ibm.com, 19 pages, published Apr. 10, 2003, printed Jan. 3, 2009—cited in U.S. Appl. No. 12/276,868., www.research.ibm.com, Apr. 10, 2003, pp. 19.

Commvault Systems, Inc., Continuous Data Replicator 7.0, Product Data Sheet, 2007.

Farley, "Building Storage Networks," pp. 328-331, Osborne/McGraw-Hill, 2000.

Gibson et al., "Network Attached Storage Architecture," pp. 37-45, ACM, Nov. 2000.

http://en.wikipedia.org/wiki/Naive_Bayes_classifier.

PCT International Search Report and Written Opinion for International Application No. PCT/US07/81681, Mail Date Nov. 13, 2009, 8 pages.

Recycle Bin (Windows), Aug. 2007, Wikipedia, pp. 1-3.

Written Opinion; International Application No. PCT/US05/40606; mailed Mar. 1, 2007; 5 pages.

* cited by examiner

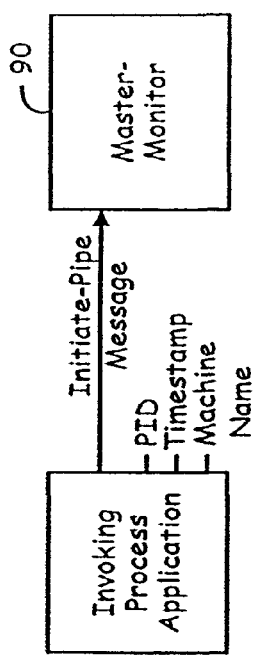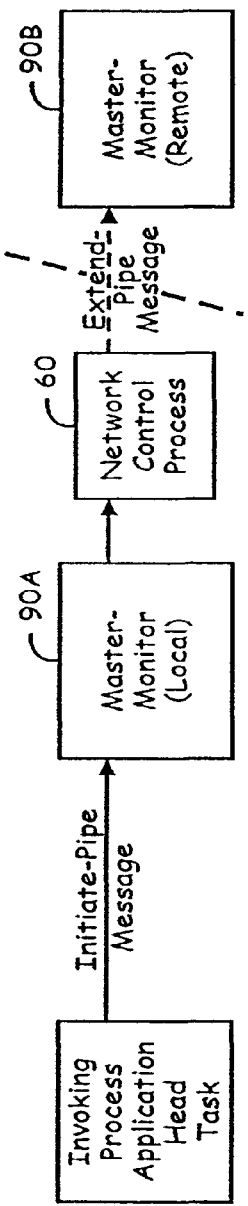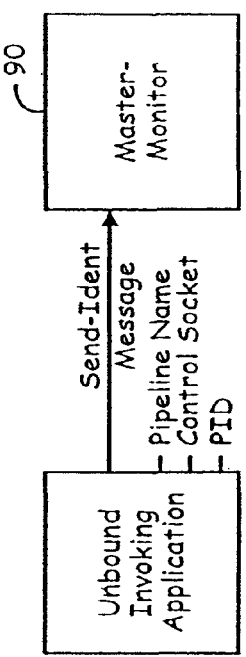

PIPELINE SYSTEMS AND METHOD FOR TRANSFERRING DATA IN A NETWORK ENVIRONMENT

RELATED APPLICATIONS

This application is a continuation of U.S. patent application Ser. No. 10/144,683, filed May 13, 2002, which is incorporated herein by reference in its entirety and which is a continuation of U.S. patent application Ser. No. 09/038,440, filed Mar. 11, 1998, entitled "PIPELINED HIGH SPEED DATA TRANSFER MECHANISM," now U.S. Pat. No. 6,418,478, issued Jul. 9, 2002, which claims priority to U.S. Provisional Patent Application No. 60/063,831, filed Oct. 30, 1997, and entitled "HIGH SPEED DATA TRANSFER MECHANISM."

BACKGROUND OF THE INVENTION

1. Field of the Invention

The invention relates to data transfer mechanisms, and in particular, to a software-based, high speed data pipe for providing high speed and reliable data transfer between computers.

2. Description of the Related Art

It is fairly obvious that data, in the process of being archived or transferred from one location to another, will pass through various phases where different operations such as compression, network transfer, storage, etc. will take place on it. There are essentially two approaches that can be taken when implementing such a transfer mechanism. One would be to split the archival process into sub-tasks, each of which would perform a specific function (e.g., compression). This would then require copying of data between the sub-tasks, which could prove processor intensive. The other method would be to minimize copies, and have a monolithic program performing all of the archival functions. The downside to this would be loss of parallelism. A third alternative would of course be to use threads to do these tasks and use thread-signaling protocols, however, it is realized that this would not be entirely practical since threads are not fully supported on many computing platforms.

Accordingly, it is highly desirable to obtain a high-speed data transfer mechanism implemented in software and developed for the needs of high speed and reliable data transfer between computers.

It is an object of the invention to disclose the implementation of the DataPipe in accordance with CommVault System's Vault98 backup and recovery product. While developing the DataPipe, it is assumed that data, as it moves from archiving source (backup client) to archiving destination (backup server as opposed to media), may undergo transformation or examination at various stages in between. This may be to accommodate various actions such as data compression, indexing, object wrapping, etc., that need to be performed on data being archived. Another assumption is the data may be transmitted over the network to remote machines or transferred to a locally attached media for archival.

Both the sending and the receiving computers execute software referred to herein as the DataPipe. Although the DataPipe transfer mechanism to be described herein is operative as a key component of backup and recovery software product schemes, the DataPipe is not restricted to that use. It is a general purpose data transfer mechanism implemented in software that is capable of moving data over a network between a sending and a receiving computer at very high speeds and in a manner that allows full utilization of one or more network paths and the full utilization of network bandwidth. A DataPipe can also be used to move data from one storage device to another within a single computer without the use of a network. Thus, the DataPipe concept is not confined to implementation only in networked systems, but is operable to transfer data in non-networked computers as well.

SUMMARY OF THE INVENTION

It is an object of the invention to provide in a communications system having an origination storage device and a destination storage device, a data transfer pipeline apparatus for transferring data in a sequence of N stages, where N is a positive integer greater than 1, from said origination to said destination device, comprising: dedicated memory means having a predetermined number of buffers dedicated for carrying data associated with the transfer of data from said origination storage device to said destination device; and master control means for registering and controlling processes associated with said data transfer apparatus for participation in the N stage data transfer sequence, wherein said processes include at least a first stage process for initiating said data transfer and Nth stage process for completing data transfer, wherein said first stage process is operative to allocate a buffer from said predetermined number of buffers available within said dedicated memory means for collection, processing, and sending of said data from said origination device to a next stage process; and wherein said last Nth stage process is operative to receive a buffer allocated to said first stage process from the (N−1)th stage process in the data transfer sequence and to free said buffer upon processing completion and storage in the destination device to permit reallocation of said buffer, said master control means further including monitor means for monitoring the number of buffers from said pool of buffers allocated or assigned to particular processes in said pipeline, wherein said monitor means is operative to prevent allocation of further buffers to a particular process when said number of buffers currently allocated exceeds a predetermined threshold.

BRIEF DESCRIPTION OF THE DRAWINGS

The invention will be better understood with reference to the following drawings, in which:

FIGS. 3A-3C illustrate various messages transferred between application processes and the master monitor process according to an embodiment of the invention.

DETAILED DESCRIPTION OF THE PREFERRED EMBODIMENT

Figure 1:
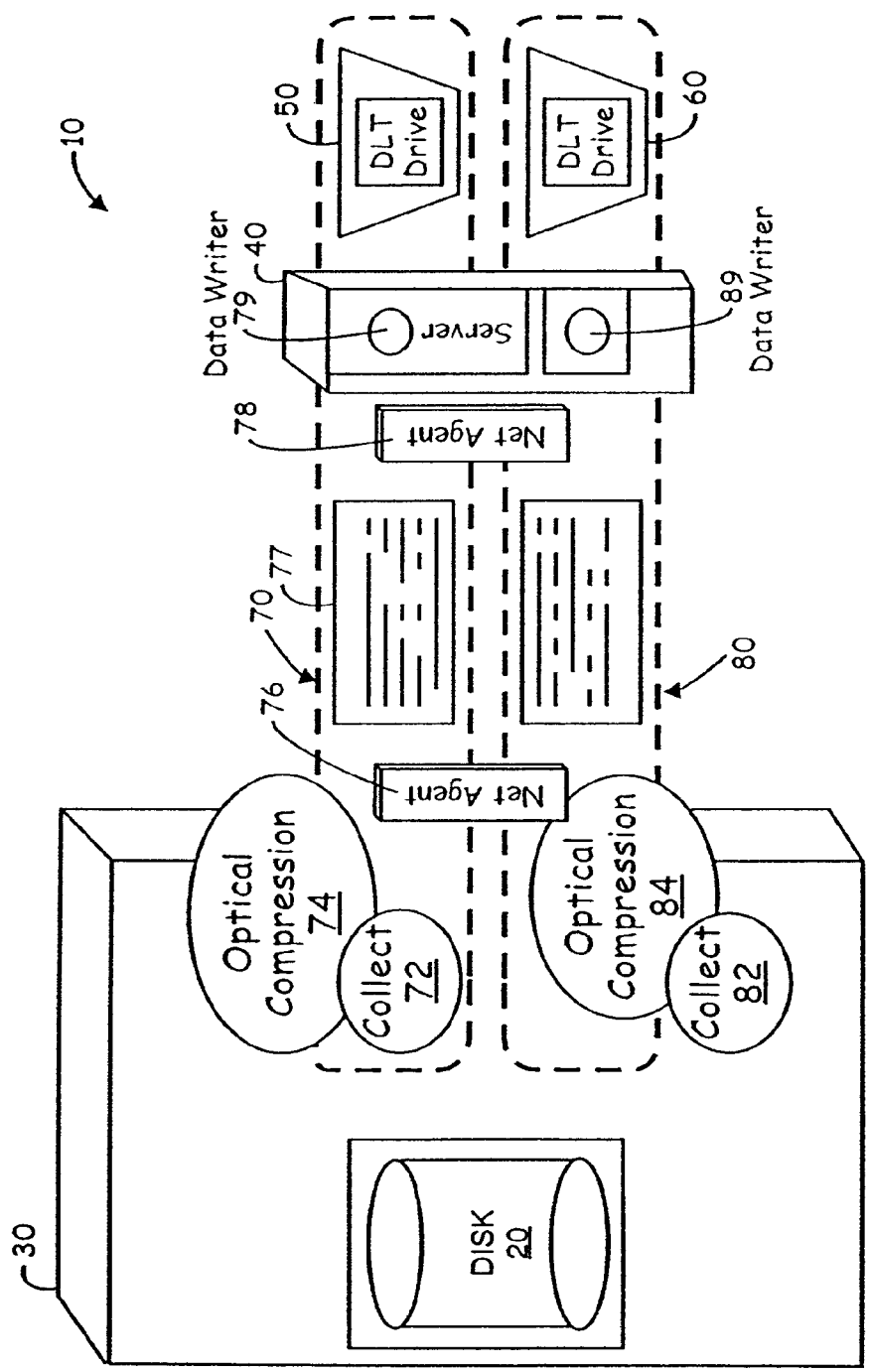
FIG. 1 is a block diagram of the data pipe architecture in accordance with the present invention.

Before embarking on a detailed discussion of the data transfer mechanism of the present invention, the following should be understood. The objective of the DataPipe according to the present invention is to move data as quickly as possible from point A to point B (which may be on the same or different computers within a network) while performing a variety of operations (compression, encryption, content analysis, etc.) on the data. In order to meet this objective, parallel processing must be fully exploited, network bandwidth must be fully utilized, and CPU cycles must be minimized. The DataPipe must be efficiently implemented on a wide variety of computer systems such that heterogeneous systems on a network can use a DataPipe to transfer data to each other.

A DataPipe comprises a named set of tasks executing within one or more computers that cooperate with each other to transfer and process data in a pipelined manner. Within a DataPipe, a pipeline concept is used to improve performance of data transfer across multiple computers in a network. However, within a DataPipe, any stage within the pipeline may have multiple instances, thus greatly increasing the scaleability and performance of the basic pipeline concept.

The DataPipe mechanism processes data by dividing its processing into logical tasks that can be performed in parallel. It then sequences those tasks in the order in which they are to act on the data. For example, a head task may extract data from a database, a second task may encrypt it, a third may compress it, a fourth may send it out over the network, a fifth may receive it from the network, and a sixth may write it to a tape. The latter two tasks may reside on a different computer than the others, for example.

All of the tasks that comprise a single DataPipe on a given computer have access to a segment of shared memory that is divided into a number of buffers. A small set of buffer manipulation primitives is used to allocate, free, and transfer buffers between tasks.

Semaphores (or other OS specific mutual exclusion or signaling primitives) are used to coordinate access to buffers between tasks on a given computer. Special tasks, called network agents, send and receive data across network connections using standard network protocols. These agents enable a DataPipe to connect across multiple computer systems. A single DataPipe can therefore reside on more than one computer and could reside on computers of different types.

Each task may be implemented as a separate thread, process, or as a procedure depending on the capabilities of the computing system on which the DataPipe is implemented.

The data exchange paradigm called the DataPipe has been fashioned to provide solutions to the problems associated and encountered in prior art data transfer systems. The salient features of this method are as follows:

1. Split the whole task of processing on data into logical sub tasks and sequence them according to the order in which they are supposed to act on the data stream.
2. Use dedicated process/threads to perform network transfer.
3. Make all the dedicated tasks share a single large shared memory segment.
4. Split the shared memory segment into small buffers so that this single buffer space can be shared among various execution threads at various stages of tasks.
5. Use semaphores (or other OS specific mutual exclusion or signaling primitives) to transfer control over the data segments between modules.

As mentioned previously, each task may be implemented as a separate thread, or process, or as a procedure in a monolithic process (in cases where native platforms don't support any forms of parallel execution or multi processing). For data transfer across network, dedicated network readers and writers ensure communication across the net. FIG. 1 shows a steady state picture of how the DataPipe architecture 10 is set up according to the present invention.

Referring to FIG. 1, there is shown a disk 20 residing on a computer machine 30 which houses information or data to be backed up or archived to server computer 40 via DLT device drivers 50 and 60 respectively. As one can ascertain, the DataPipe represents the end-to-end architecture which may be utilized during database backup from the disk drive 20 where the database resides to the tape or optical devices 50 and 60 at server 40. The DataPipe thus removes the network as the limiting factor in backup performance. As a result, the device pool defines the performance capabilities.

As shown in FIG. 1, the DataPipe or stream 70 is created for the transfer of data for each device in the device pool to be used simultaneously, which comprises modules 72, 74, 76, 78 and 50. Similarly, a second DataPipe 80 is shown comprised of modules 82, 84, 76, 78 and 60. Note that if additional DLT devices are used to backup data and parallel further DataPipes would be provided. Since one can ascertain the concept of the DataPipe through explanation of one path or thread by which data is transferred, further description will focus on processing through a single DataPipe or stream 70, as shown in FIG. 1. At the head of the DataPipe is the collector component 72 which is responsible for obtaining the database information from disk 20. The data is passed down in buffers residing in dedicated shared memory through the pipeline 70, through an optional compression module 74, to the network interface modules 76. At the network interface, data is multiplexed and parallel network paths 77 obtain maximum throughput across the network. Preferably, each network path runs at a rate equal to approximately 10 base T or the number of network paths utilized for each stream as determined by the bandwidth of the network. Note that as higher performance levels are necessary, additional devices may be used simultaneously with additional network interfaces added and utilized to further increase network throughput. On the receiving side, from the database server 40, the device pull appears local to the machine and the DataPipe architecture appears as a cloud with no constraints to performance. Network interface module 78 operates to transfer the data received across the network to device driver 50 for storage at server 40. Thus, the final task of storing or archiving the data is accomplished at DLT device module 50.

Figure 2A:
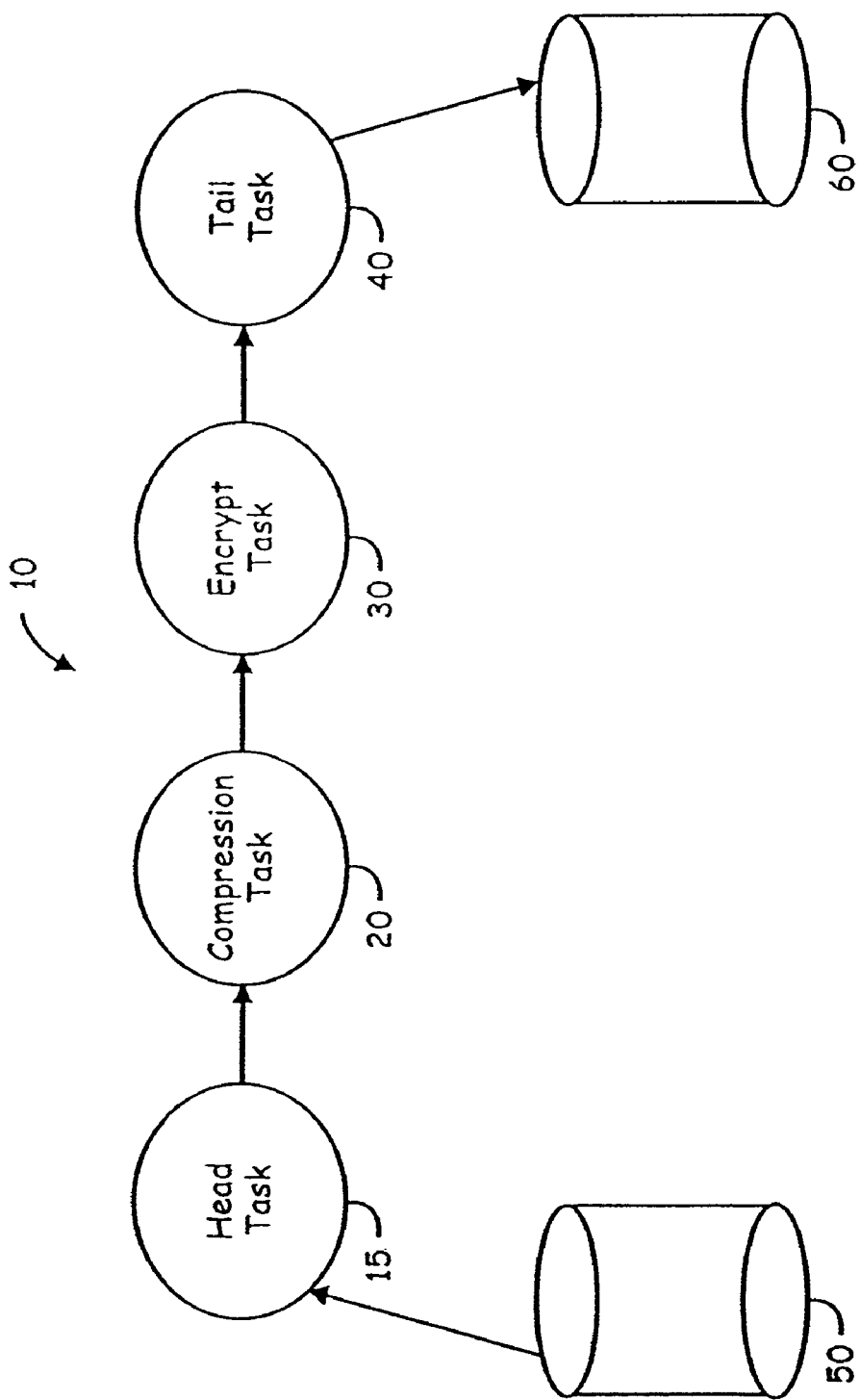
FIG. 2A is a schematic of the data pipe transfer process on a single computer according to an embodiment of the invention.

From the preceding discussion, one can ascertain that a pipeline or DataPipe 10 comprises a head task 15 that generates the data to be archived or transferred from store 50, and a tail task 40 which accomplishes the final task of storing or writing the data to store 60, including archiving or restoring on the data as shown in FIG. 2A. One or more middle modules 20, 30 may exist, which processes the data by performing actions such as compression, encryption, content analysis, etc., or by allocating or not allocating new buffers while doing the processing.

Figure 2B:
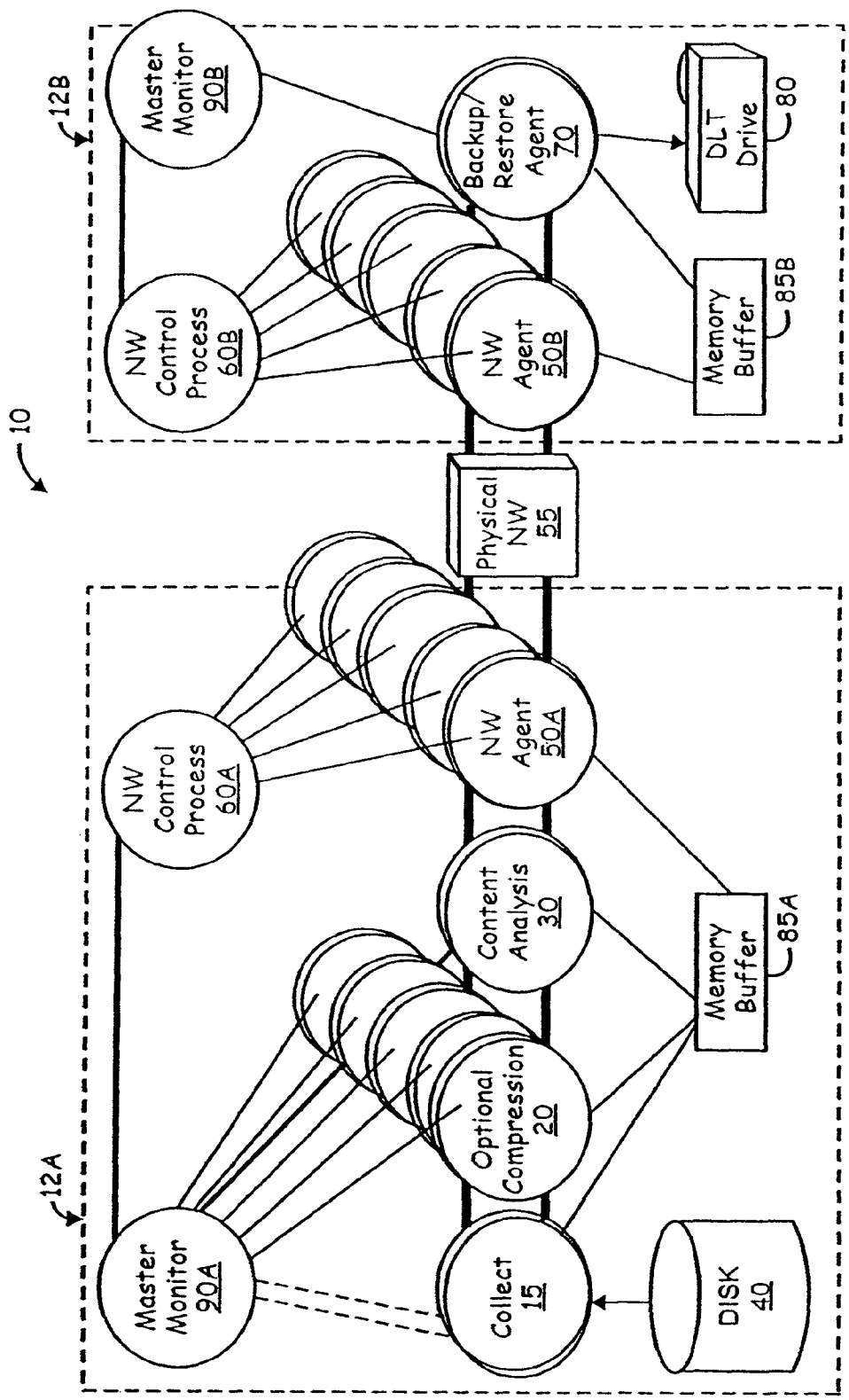
FIG. 2B is a schematic of the data pipe transfer process on multiple computers according to another embodiment of the invention.

A pipeline on a particular machine can be arranged to provide a feed to another different machine. A schematic diagram is illustrated in FIG. 2B. In this case, the DataPipe resides on more than one computer. This is done with the aid of network agents and control processors 50A, 50B, 60A and 60B. In such cases, the first machine 12A has a head 15 and other modules 20, 30, etc., comprise middle processes, but the tail of this pipeline on this machine is a cluster of dedicated network agents 50A which send data across to the remote machine 12B via standard network protocols. On the remote machine, a cluster of dedicated network reader agents 50B act as the head, and along with other modules such as middle (not shown) and tail 70, constitute the pipeline on that machine.

In addition to the transferring of data from one computer to another, a unique capability of the datapipe invention is the ability to scale to enable full utilization of the bandwidth of a network, and to fully utilize the number of peripheral devices such as tape drives, or fully utilize other hardware components such as CPUs. The scaleability of a DataPipe is achieved by using multiple instances of each task in the pipeline.

For example, multiple head tasks operating in parallel may gather data from a database and deposit it into buffers. Those buffers may then be processed by several parallel tasks that perform a function such as encryption. The encryption tasks in turn may feed several parallel tasks to perform compression, and several parallel tasks may perform network send operations to fully exploit network bandwidth. On the target computer, several network reader tasks may receive data, which is written to multiple tape units by several tasks. All of these tasks on both computers are part of the same DataPipe and collectively perform the job of moving data from the database to tape units. They do this job extremely efficiently by fully utilizing all available bandwidth and hardware allocated to the DataPipe while also minimizing CPU cycles by avoiding unnecessary copying of the data as it moves from one stage of the DataPipe to the next.

FIG. 2B shows the multiple computer case where a single head task (collect process) gathers data from the disk 40 and deposits it into buffers. The buffers are then processed by several parallel instantiations of compression process 20 which upon completion of processing of each buffer for each instantiation sends the process buffer to process 30 which performs content analysis, and sends the processed buffer data to several network agent tasks 50A or instantiations, which perform the network operations to send the data over the physical network 55 where it is received and processed by corresponding network agents 50B on the remote computer 12B and sent to tail backup/restore process 70 for storage or writing to DLT drive 80.

In general, there could be N stages in a given DataPipe pipeline. At each stage of the pipeline, there could be p instances of a given module task. These N stages could all be on the local machine or could be split across two different machines in which case there are network writers and network readers (i.e. pseudo tail and head network agents) which work together to ensure continuity in the pipeline.

Referring to FIG. 2B, each DataPipe has a dedicated memory segment 85 on each machine on which the DataPipe resides. For example, a DataPipe that sends data from machine 12A to machine 12B has two dedicated memory segments, one on machine A and one on machine B. Tasks that are part of this DataPipe may allocate and free buffers within these memory segments. Of course, tasks operating on machine 12A may only allocate or free buffers within the memory segment 85 on machine A and likewise for tasks on machine B. Thus, any of these modules may allocate or free segments of a single large shared memory on each machine dedicated for the use of this particular pipeline.

Buffer Manipulation Primitives

Figure 2C:
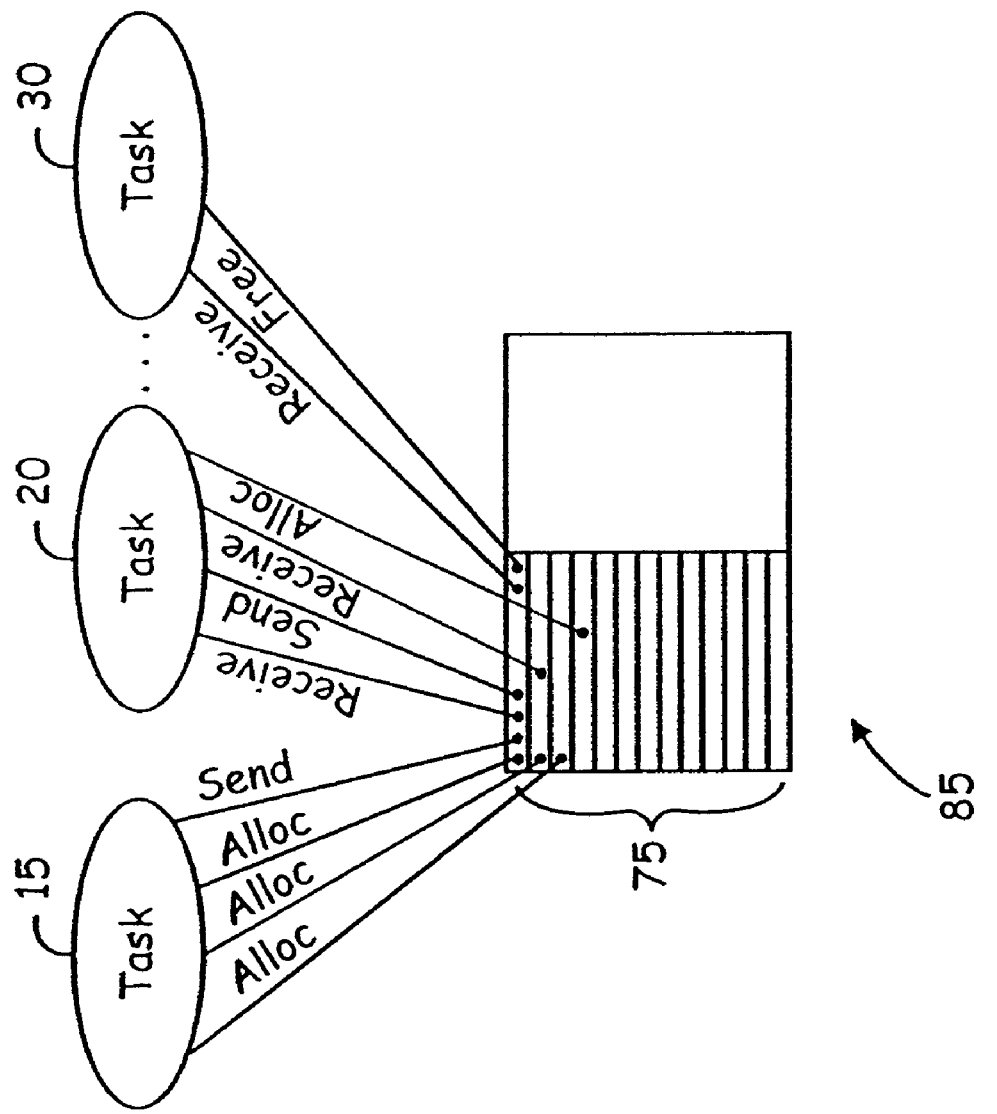
FIG. 2C is a schematic of the data pipe transfer buffer allocation process from a buffer pool stored in the shared memory according to an embodiment of the invention.

Referring now to FIG. 2C, each task or process (15) that wishes to allocate a buffer does it from a buffer pool 75 stored in the shared memory segment 85 owned by the DataPipe using AllocBuf( ). Each task that wishes to process incoming data from the previous task executes a receive call using ReceiveBuf( ). Each task that wishes to relinquish control of a particular buffer so that the next task can operate on it, performs a SendBuf( ) on that buffer to send it to the next task. Each task that wishes to destroy a buffer and return it into the buffer pool, does so by executing a FreeBuf( ) on that buffer.

Master_Monitor is connected to a predefined port, to enable it to communicate with its peers on other computer systems. Master_Monitor monitors the status of all DataPipes under its control at all times and is able to provide status of the DataPipe to the application software that uses the DataPipe.

Figure 2D:
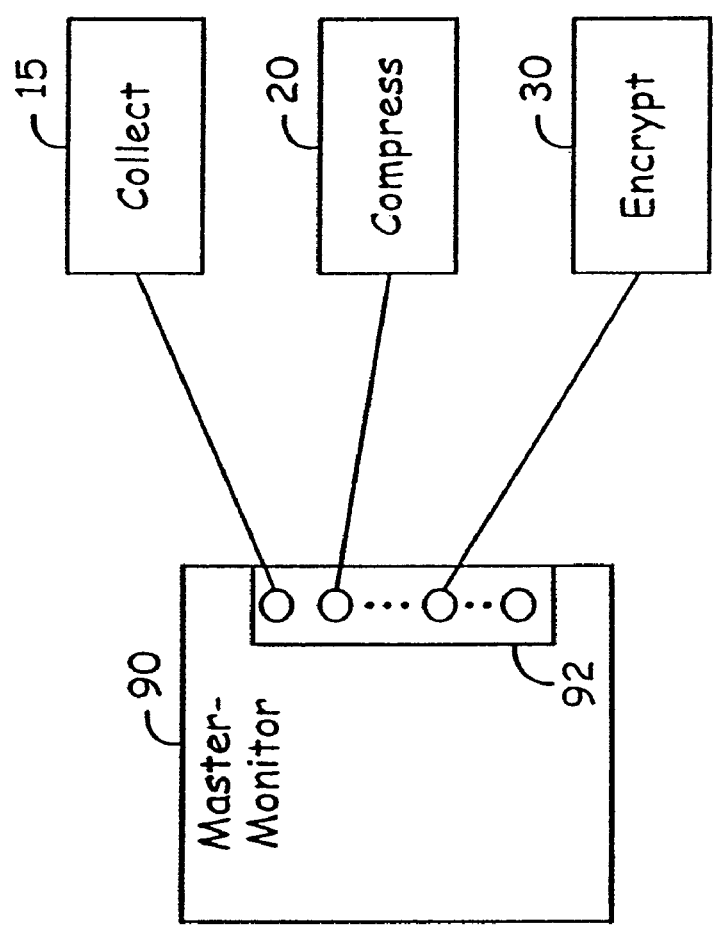
FIG. 2D is a schematic illustrating the controlling relationship of the master monitor process to the various attached processes according to an embodiment of the invention.

To accomplish these above tasks, a master manager program called Master_Monitor executes in the preferred embodiment as a daemon on all process machines, listening on a well-known port, to serve requirements of pipeline operations. Master_Monitor functions to monitor status of all pipelines under its control at all times and reports status of the pipeline to all its sub-modules. As shown in FIGS. 2B and 2D, Master_Monitor includes control messaging sockets 92 open to all modules through which it can control or change status of execution of each module. Master_Monitor 90 further includes functions which monitor status and listings of all centrally shared resources (among various modules of the same pipeline) such as shared memory or semaphores or any similar resource. Master_Monitor unless otherwise requested will initiate all modules of the pipeline either by fork( ) or thread_create( ) or a similar OS specific thread of control initiation mechanism. Master_Monitor will permit initiation of a pipeline with proper authentication. This initiator process can identify itself as either a head process or a tail process, which will later attach itself to the pipeline. (Exception is made in the case of a networking module, for this facility. A network process will not be allowed to attach itself as the head or tail of any pipeline.)

DataPipe Initiation

Referring now to FIG. 3A in conjunction with FIGS. 1 and 2A-2D, a DataPipe is created by calling Master_Monitor and passing it an Initiate_Pipe message. In this message, parameters such as the DataPipe name, DataPipe component module names, the number of parallel instances for each component, properties of each component (e.g., whether they allocate buffers or not), local and remote machines involved in the DataPipe, direction of flow, nature of the invocation program, etc., are passed to Master_Monitor. Note that the term "module" refers to a program that is executed as a task as part of an instance of a DataPipe. Each module may have more than one instance (e.g., execute as more than one task) within a DataPipe.

Referring now to FIG. 3B, depending upon the nature of the invocation program, it may be required that the process invoking the DataPipe needs to identify itself to the local Master_Monitor 90A and attach itself to the DataPipe as a head or tail task. In order to operate over a network on two computers, the Master_Monitor 90 initiates a Network Controller Process 60 on the first machine which contacts Master_Monitor 90B on the second machine where this DataPipe is to be completed using an Extend Pipe message. All information required for establishing the second side of the DataPipe is passed along with this call so that the DataPipe is completely established across both machines.

Identification

The process responsible for initiation of the pipeline constructs a name for the pipeline using its own process Id, a time stamp, and the name of the machine where the initiator process is running. This pipeline name is passed along with both the Initiate-Pipe as well as the EXTEND_Pipe message so that the pipeline is identified with the same name on all computers on which it is operating (i.e., both the remote as well as the local machine). All shared memory segments and semaphores (reference numeral 85 of FIG. 2C) attached to a particular pipeline are name referenced with this pipeline name and definite offsets. Hence the process of identification of a specific semaphore or shared memory associated with this pipeline is easy and accessible for all processes, and bound modules (i.e., modules for which control is initiated by the Master_Monitor). Each unbound module (i.e., a module not initiated via Master_Monitor, which attaches itself after the pipeline is initiated) must identify itself to its local Master_Monitor via a SEND_IDENT message shown in FIG. 3C. This message contains the name of the pipeline the unbound module wants to attach itself to, a control socket, and a process/thread id, which Master_Monitor uses to monitor status of this particular module.

Data Transfer Implementation

Allocation: Receive: Send: Free

Figure 4A:
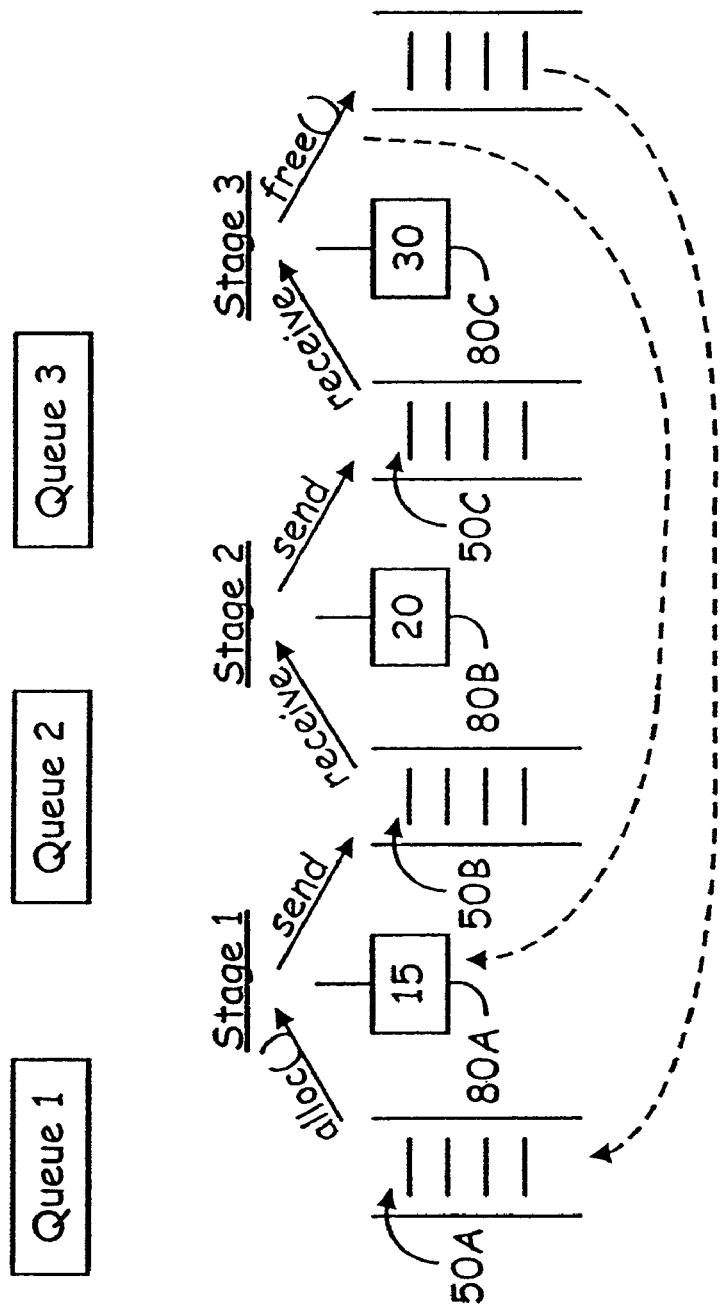
FIGS. 4A and 4B illustrate schematics of the module attachment process to shared memory space in accordance with the present invention.
Figure 4B:
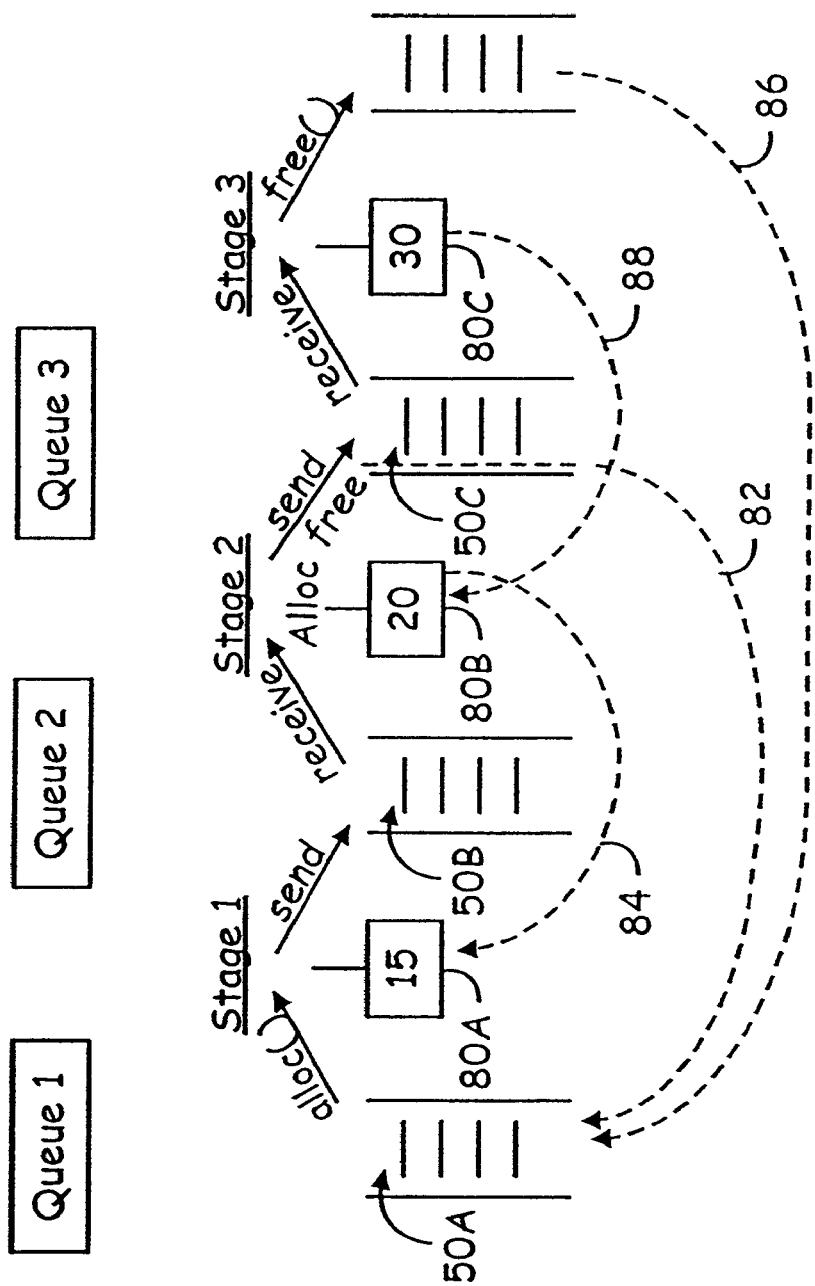

Directing attention to FIG. 2C and FIGS. 4A and 4B, buffers are allocated using the call AllocBuf( ), from a common pool of buffers specified for the particular pipeline. The pool consists of a single large shared memory space 75 with Max Buffers number of equally sized buffers and an "rcq" structure. The "rcq" structure illustrated in FIG. 4A, contains input and output queues for each stage of the pipeline on that particular machine. Access to shared memory is controlled using a reader writer semaphore.

As shown in FIGS. 4A and 4B, the input queue of an ith stage module is the output queue of the (I−1)th stage module. The input queue of the first module is the output queue of the last module of the pipeline on that machine. Allocation is always performed done from the input queue of the first module or process. However, to ensure that no allocation task can unfairly consume buffers, allocation of buffers to each module is limited to a threshold value of Max—Buffers/NA, where NA is the number of allocators in the pipeline on this particular machine. These parameters are stored under control of the Master_Monitor program, which determines whether any process has exceeded its allocation. This means there could be K unfreed buffers in the system allocated by a single instance of a module H, where K is Max—Buffers/NA. Further allocation by module H will be possible when a buffer allocated by H gets freed.

All FreeBuf( ) calls free their buffers into the input queue of first module. By the same rule, first stage modules are never permitted to do a ReceiveBuf( ) but are permitted to do AllocBuf( ). On the other hand, tail processes are permitted to perform only FreeBuf( ) and never permitted to do a SendBuf( ). All other modules can Receive, Allocate, Send, and Free buffers. First stage modules always perform SendBuf( ) after they execute each AllocBuf( ).

Each queue 95 is associated with a semaphore to guarantee orderly access to shared memory and which gets triggered upon actions such as AllocBuf( ), ReceiveBuf( ), SendBuf( ) and FreeBuf( ). Dedicated network agents thus map themselves across any network interface on the system, as long as data propagation is ensured. The number of network agents per pipeline is a configurable parameter, which helps this mechanism exploit maximum data transfer bandwidth available on the network over which it is operating. A single dedicated parent network thread/process monitors performance and status of all network agents on that particular machine for a particular pipeline.

Referring again to FIG. 4A, upon allocation of a buffer by AllocBuf( ) or receipt of a buffer by ReceiveBuf( ), the buffer is taken off from the input queue and assigned to the module which performed the call. Upon completion of processing on this buffer, it is passed forward by mean of SendBuf( ) or FreeBuf( ) and the buffer is forwarded to its destination queue or it is freed for reuse by FreeBuf( ). AllocBuf( ) decrements the input queue semaphore of the first module and also decrements the semaphore which is the allocator Index for this particular module. Each FreeBuf( ) increments the allocator Index of the module who allocated this particular buffer. Information relevant to this operation is always available along with the buffer with which we are performing the free operation.

Attachments

As the identification process is completed, all modules attach themselves to a specific shared memory space segment that is shared among modules on that machine for this particular pipeline. This shared memory segment has many data buffers, input queues for all stages on the pipeline, and their initial values. Each module identifies its own input queues and output queues depending on the stage that module is supposed to run at, and initial queue (first stage) is populated with number of data segments for sharing on this particular pipeline. Also all modules attach themselves to an allocator semaphore array, which controls the number of buffers allocated by a specific module that can be active in the pipeline.

Data Integrity

Figures 5A, 5B:
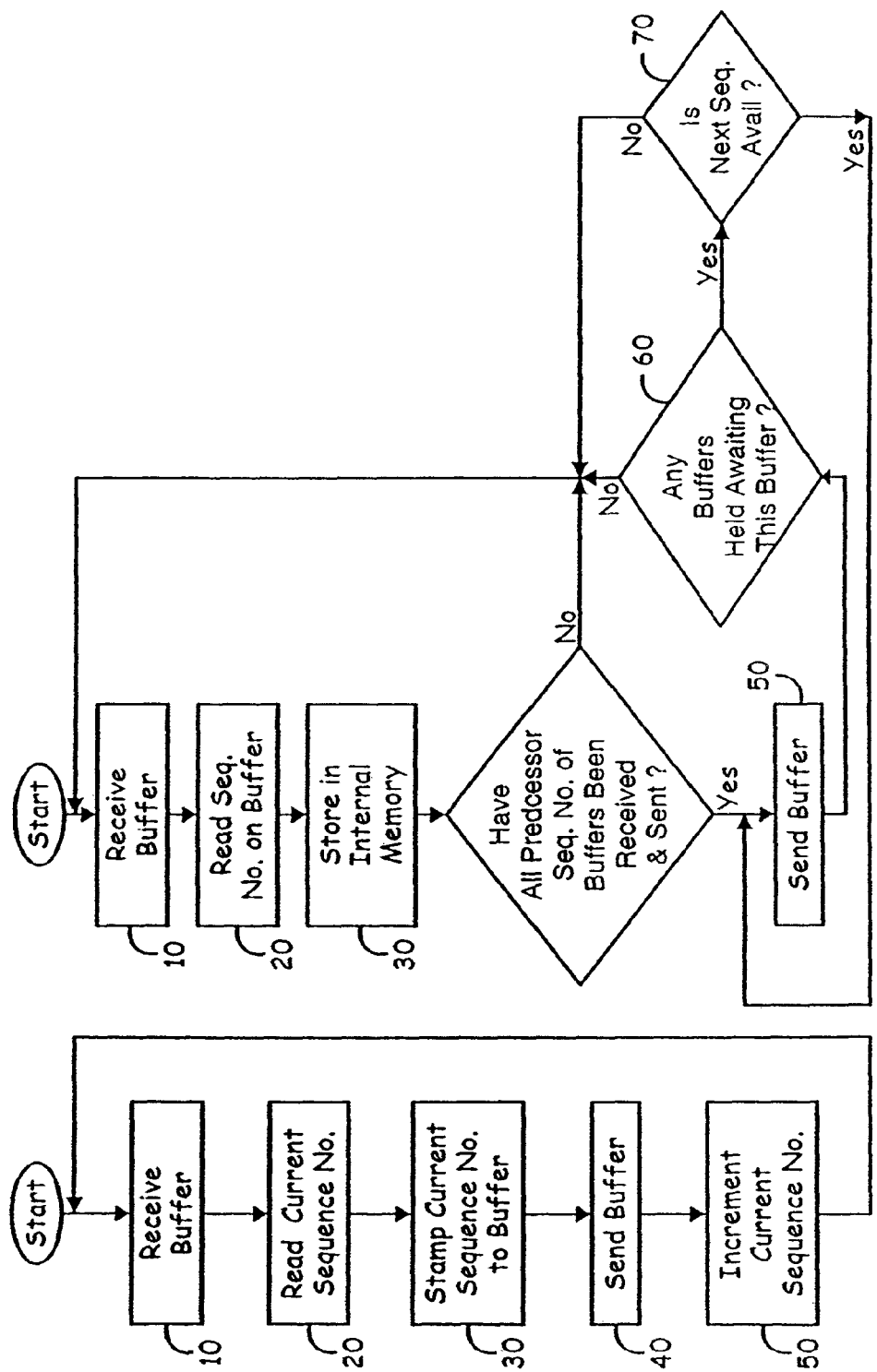
FIGS. 5A and 5B depict flow diagrams of the operation of the sequencer and resequencer processes according to the present invention.

Integrity of the data passed along and the sequencing of data are maintained in part by a pair of special purpose modules termed sequencer and resequencer processes. FIGS. 5A and 5B provide diagrams of the operation of the sequencer and resequencer processes respectively. Referring to FIG. 5A, the sequencer process receives each buffer (module 10), reads the current sequence number stored in memory (module 20), and then stamps the buffer, and then stamps the buffer with the current sequence number (module 30) and sends the stamped buffer to the next stage for processing (module 40). The current sequence number is then incremented (module 50) and the process is repeated for each buffer received by the sequencer. The resequencer is operative to receive all input buffers and store them internally and wait for the required predecessor buffers to show up at the input queue before forwarding them all in the next sequence to the next stage of processing.

Referring now to FIG. 5B, the resequencer receives a buffer (module 10) of data and determines the sequence number associated with that buffer (module 20). The buffer is then stored in internal memory (module 30) and a determination is made as to whether all preceding sequence numbers associated with buffers have been received and stored (module 40). Until then, the re-sequencer waits for the required predecessor buffers to show up at the input queue. When all predecessor buffers are available, these buffers are sent (module 50) to the next processor stage. The sequencer/re-sequencer process pairs thus ensure proper data sequencing across a set of network reader/writer modules having multiple instantiations of a particular process. Note however, that when there is only one instance of a module present at any particular stage, by virtue of the queuing mechanism available with all input queues, data sequence in the right order is insured.

Hence, in the preferred embodiment, all data pipe transfers employing multi-instance stages via the sequencer/resequencer processes ensure that the input sequence of sequence numbers are not violated for each instance of the module. Further, the restriction that all modules of a specific multi-instance stage should be of the same type eliminates the chances for preferential behavior.

Fairness

The concept of fairness means that each task will be assured of getting the input buffers it needs to operate on without waiting longer than necessary. Fairness among the modules in a given DataPipe where no stage of the pipeline has more than one instance is automatic. As the tail task frees a buffer it enters the free buffer pool where it may enable the head task to allocate it and begin processing. All tasks in the DataPipe operate a maximum speed overlapping the processing done by other tasks in the preceding or following stage of the pipeline.

If a DataPipe has stages consisting of parallel instances of a task, fairness among those tasks is assured by using an allocator semaphore which counts from Max_Buffers/NA (where NA is the number of allocators for this DataPipe on this particular machine) downward to zero. All FreeBuf( )s increment this semaphore back, however, there could be only Max—Buffers/NA buffers allocated by any allocator module in this DataPipe. This ensures that all allocators get a fair share of the available total number of input buffers. If a particular process attempts to allocate more buffers than it is allowed, the master_monitor process prevents such allocation, causing the process to either terminate or wait until a buffer currently allocated to the process becomes freed thereby incrementing the semaphore back up to allow the process to allocate another buffer.

Control Messages

All instances of all modules have a control socket to Master_Monitor over which control messages are exchanged. All network readers/writers have an analogous control socket to their parent network agent. The parent network agent itself has a control socket to Master_Monitor. Each module periodically checks its control socket for any messages from Master_Monitor. Critical information such as a STOP_PIPE message is passed to Master_Monitor via this mechanism.

Status Monitoring

Each module initiated by Master_Monitor on a given machine is monitored by either a parent network process (in the case of network reader or writer), or by Master_Monitor itself, for states of execution. In case any module is reported as having terminated abnormally, Master_Monitor identifies this exception, and signals all the modules on that particular pipeline to stop. This is done by means of control messages through control sockets as described previously. Upon safely stopping all modules pertaining to this particular pipeline, it signals the remote machine's Master_Monitor to stop the remote side of this particular pipeline and entire pipeline is shut down safely by means of control message signaling.

Implementation

In a preferred embodiment, DataPipe is implemented on Sun Solaris or HP-UX operating systems and incorporated into Release 2.7 of CommVault System's Vault98 storage management product.

Figure 6:
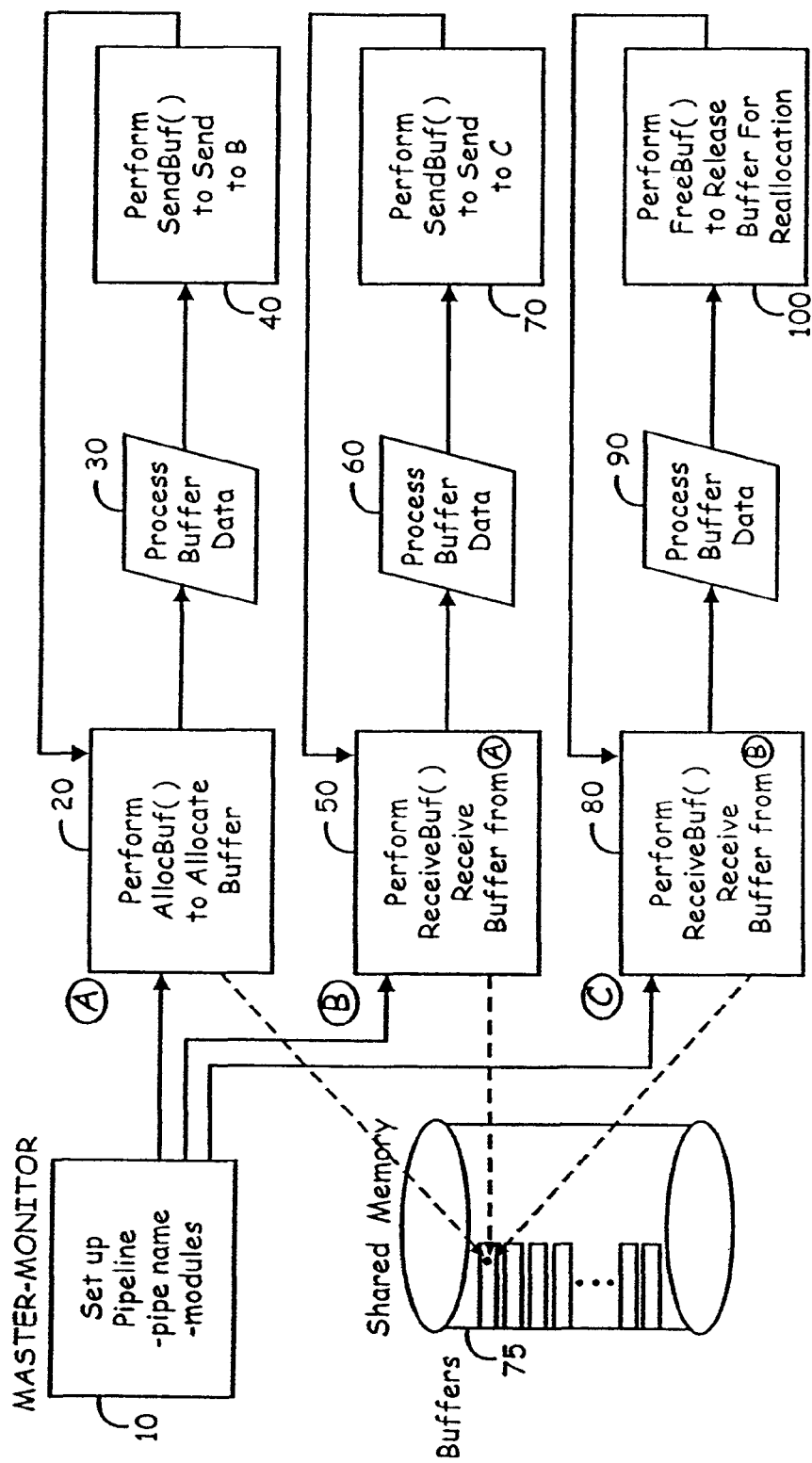
FIG. 6 depicts an exemplary data transfer flow among various processing stages within the pipeline according to the present invention.

FIG. 6 is an illustrative example of the sequence of primitive commands used to set up a DataPipe. The DataPipe is then used to process data in three modules named A, B and C.

To set up the DataPipe the Master_Monitor for this is called giving it the name of the DataPipe and the names of the modules that will use the pipe (module 10).

Master_Monitor (Initiate_Pipe(Sample_pipe,A,B,C)). Within the logic of module A, Alloc_Buf( ) function is then called to obtain a buffer (20). The logic of module A may perform any actions it wants to fill the buffer with useful data. When it has completed its processing of the buffer (30), it calls SendBuf( ) to send the buffer to module B for processing (40). Module A then repeats its function by again calling Alloc_Buf( ) to obtain the next buffer.

The logic of module B calls ReceiveBuf( ) to obtain a buffer of data from module A (50). It then operates on the buffer by performing processing as required (60). When it is finished with the buffer it calls SendBuf( ) to send that buffer to module C (70).

Module B then repeats if function by again calling ReceiveBuf( ) to obtain the next buffer from module A.

Module C obtains a buffer of data from module B by calling ReceiveBuf( ). When it has completed its processing of the data in that buffer (90), it calls FreeBuf( ) to release the buffer (100). Like the other two modules, it loops back to receive the next buffer form module B.

The primitives used to allocate, free, send, and receive buffers are synchronized by the use of semaphores. This ensures coordination between the modules so that the receiving module does not start processing data before the sending module has finished with it. If no buffer is available, the AllocBuf or ReceiveBuf primitives will wait until one is available. All three modules operate in parallel as separate tasks. The order of processing from A to B to C is established in the initial call to Master_Monitor that established the DataPipe.

Figure 7:
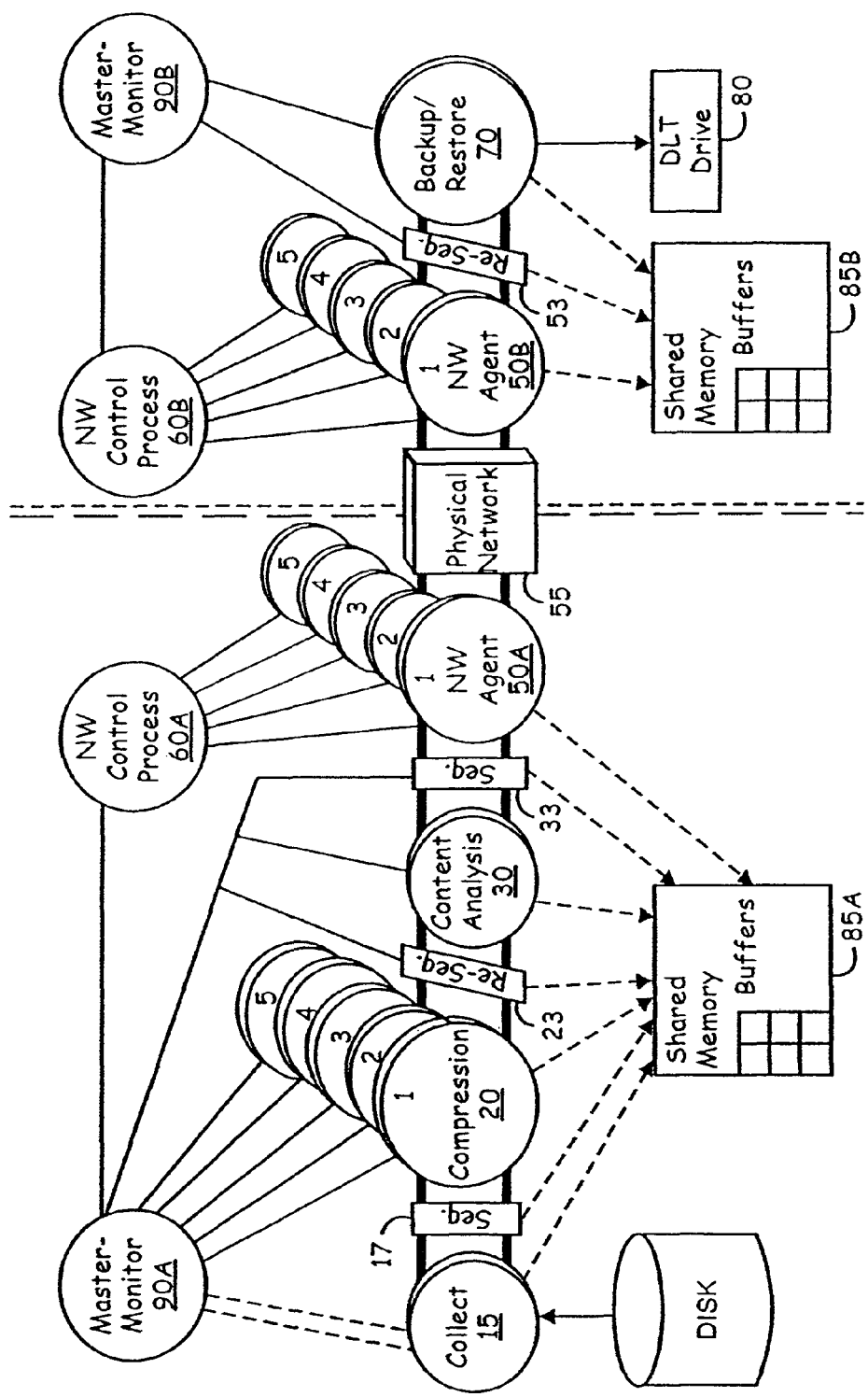
FIG. 7 illustrates a data pipe transfer process on multiple computers having processes with multiple instantiations according to an embodiment of the present invention.

Referring now to FIG. 7, there is shown another embodiment of the DataPipe apparatus as it is used within Vault98 to provide a high speed path between a "client" system containing a large database that is being backed up to the "CommServ" server and stored as archive files on a DLT drive. Everything on the collect side of the physical network is part of the client software configuration, whereas everything on the DLT drive side of the physical network are part of the server software configuration. The "collect" activities on the client prepare data to be sent over the DataPipe to the CommServ.

FIG. 7, which is similar to FIG. 2B, depicts a two computer configuration where a header task 15, identified as a collect process, is initiated via Master_Monitor daemon 90A on the first computer. Collector 15 retrieves data from the disk and allocates the buffer from the shared memory 85A for processing the data to be transferred. Collector 15 then sends the data to the compression process 20 which functions to compress the data as it moves over the pipe. As show in FIG. 7, multiple instantiations of compression module 20 are provided at this stage for effectively processing the data as it flows across the system. Accordingly, sequencer 17 initiated by Master_Monitor 90A is coupled directly between collect module 15 and compressor module 20 to stamp each of the buffers with the sequence number as described previously. Re-sequencer module 23 is coupled to the output queue of the compression module 20 instantiations to properly reorder and re-sequence the buffers sent from the instantiations of module 20 to content analysis module 30. Content analysis module 30 then receives the buffers from re-sequencer 23, processes the data, and sends the buffers to sequencer 33, which again stamps the buffers and sends them to multiple instantiations of network agents 50A for processing across the physical network via standard network protocol such as TCP IP, FTP, ICMP, etc. Network agents 50B are instantiated by network control processor 60B in communication with remote Master_Monitor 90B to provide multiple network agent instantiations, where each agent on the remote side uniquely corresponds and communicates with corresponding agent on the local side. In the preferred embodiment, each network agent 50A on the local side performs a copy of the data in the buffer for transfer over the physical network to its corresponding network agent 50B on the remote side and then performs a free buffer function call to free the buffers associated with shared memory 85A for reallocation. On the remote side, the network agent 50B receives the data transferred over the network and acts as a header on the remote side to allocate each of the buffers in shared memory 85B. These buffers are then sent to re-sequencer 53 which stores buffers received in internal memory until each of the predecessor buffers are received, and then forwards them to the backup restore process 70 via the send buff function. The backup restore process then functions to write the contents of each of the buffers received to DLT drive 80, and upon completion, frees each of those buffers to permit further reallocation in the buffer pool and shared memory 85B. As one can see, this pipeline could be set up over any high speed network, such as ATM, FDDI, etc. The pipeline is capable of utilizing entire practical bandwidth available on the physical network by means of multiple network agents. In cases where real high speed networks are available (networks which have transfer rates higher than DLT drives), multiple pipelines are set up, to utilize resources available to the full extent.

Salient Features

From the foregoing discussion, numerous advantages of the data pipe pipeline data transfer system using semaphore signaled shared memory to produce a general purpose, flexible data transfer mechanism are apparent. Included among these advantages are:

1. Its flexible nature—the modules that are plugged into a pipeline can be easily changed based on the application.
2. It allows for having multiple instances of a given module running in a given stage of the pipeline. This allows for parallelism over and beyond what the pipeline already provides.
3. It provides a well-defined mechanism for startup and shutdown of a pipeline and includes housekeeping and cleanup mechanisms provided via Master_Monitor.
4. It allows the application control over the amount of network bandwidth it wants to take advantage of. It is easily possible to take complete advantage of a wideband transport mechanism simply by increasing the number of network agents.
5. It provides built-in scheme for fairness among modules. In other words, no single module can retain all the input buffers, or no single instance of a multi-stage module can keep the other instances from operating.
6. It allows easy integration with a 3rd party software by virtue of the fact that the DataPipe provides for any module to attach itself as an unbound end-point (head or tail).
7. It allows for easy check pointing by virtue of a tail-head socket connection.

However, it should be remembered that shared memory on a particular machine is not shared among various other machines. Thus, we are not exploiting implicit results of a distributed shared memory, but doing data transfer, only on a demand basis, discarding all weed buffers, with selective copy, for best performance on a data transfer paradigm. Thus, the invention described herein represents a real data transfer system rather than a commonly seen distributed shared memory paradigm.

While there has been shown preferred embodiments of the present invention, those skilled in the art will further appreciate that the present invention may be embodied in other specific forms without departing from the spirit or central attributes thereof. All such variations and modifications are intended to be within the scope of this invention as defined by the appended claims.

What is claimed is:

1. A pipeline system for providing data transfer between multiple computing devices, the pipeline system comprising:
   a datapipe that spans multiple computing devices, the datapipe comprising a sequence of stages for transferring data from an origination computing device to a destination computing device, wherein the datapipe is identified on the origination computing device and the destination computing device with a data pipeline identifier;
   a first control module resident on the origination computing device and configured to register and control a plurality of first processes resident on the origination computing device, the first control module being further configured to register multiple instantiations of the same first process in a given stage of the sequence of stages, wherein the multiple instantiations are associated with the datapipe identifier;
   a second control module resident on the destination computing device and configured to register and control a plurality of second processes resident on the destination computing device, wherein at least one of the second processes on the destination computer are associated with the datapipe identifier;
   a first dedicated memory comprising a first pool of buffers resident on the origination computing device, wherein the first dedicated memory is shared among the plurality of first processes registered on the origination computing device, wherein the first control module allocates a first sequence of buffers from the first pool of buffers in the origination computing device to the plurality of first processes registered on the origination computing device, and wherein the first sequence of buffers is associated with the datapipe identifier until the first sequence of buffers is freed by the first control module;
   a second dedicated memory comprising a second pool of buffers resident on the destination computing device, wherein the second dedicated memory is shared among the plurality of second processes registered on the destination computing device, wherein the second control module allocates a second sequence of buffers from the second pool of buffers in the destination computing device to the plurality of second processes registered on the destination computing device, and wherein the second sequence of buffers is associated with the datapipe identifier until the second sequence of buffers is freed by the second control module; and
   a first network control module and a second network control module coupled, respectively, to the first and second control modules and configured to initiate network agent processes to enable data transfer communications between the origination computing device and the destination device.

2. The pipeline system of claim 1, wherein the same first process comprises a data compression process.

3. The pipeline system of claim 1, wherein the plurality of first processes further includes an intermediate stage process registered with the first control module and coupled between a first stage process and a last stage process, for receiving buffers of data, processing the buffers of data, and sending the processed buffers of data to a next stage process.

4. The pipeline system of claim 3, wherein each of the plurality of first processes includes:

an input queue for receiving or allocating at least one buffer of the first pool of buffers; and an output queue for sending or freeing the at least one buffer.

5. The pipeline system of claim 3, wherein the intermediate stage process includes a sequence process coupled between a single instantiation of the first stage process and multiple instantiations of the next stage process, for stamping each buffer received from the first stage process with a sequence number prior to sending to the multiple instantiations of the next stage process.

6. The pipeline system of claim 5, wherein the intermediate stage process further includes a re-sequence processor coupled to the output queue of the multiple instantiations of the next stage process for reordering a buffer sequence received according to the sequence number.

7. The pipeline system of claim 1, wherein each of the first dedicated memory and the second dedicated memory further includes a plurality of semaphores each associated with a particular input/output queue for controlling access to the associated dedicated memory.

8. The pipeline system of claim 1, wherein the pool of buffers in each of the first dedicated memory and the second dedicated memory comprises buffers of equal size.

9. The pipeline system of claim 1, wherein the first control module is initiated via a request message from a requesting application process, the request message including a process identification and a timestamp.

10. The pipeline system of claim 1, wherein the first pool of buffers is configured to be locked against further allocation until freed by the first process to which the first pool of buffers is assigned.

11. A method for transferring data in a pipeline system, the method comprising:

registering and initiating a plurality of pipeline processes associated with a data transfer pipeline that spans multiple computing devices, the data transfer pipeline comprising a plurality of stages, wherein the data transfer pipeline is identified on the origination computing device and the destination computing device with a data pipeline identifier;

initiating network agent processes to enable data transfer communications between a first computing device and a second computing device;

allocating a first dedicated memory having a pool of first buffers on the first computing device and sharing the first dedicated memory with a plurality of first processes of the pipeline processes residing on the first computing device, wherein a first sequence of first buffers from the pool of first buffers are allocated to the plurality of first processes, and wherein the first sequence of first buffers are associated with the data pipeline identifier until the first sequence of first buffers are freed;

allocating a second dedicated memory having a pool of second buffers on the second computing device and sharing the second dedicated memory with a plurality of second processes of the pipeline processes residing on the second computing device, wherein at least one of the second processes are associated with the data pipeline identifier, and wherein a second sequence of second buffers from the pool of second buffers are allocated to the plurality of second processes, and wherein the second sequence of second buffers are associated with the data pipeline identifier until the second sequence of second buffers are freed;

registering multiple instantiations of at least one of the first processes with a given stage of the plurality of stages in the data transfer pipeline, wherein the multiple instantiations are associated with the data pipeline identifier; and transferring data through the plurality of stages from the first computing device to the second computing device.

12. The method of claim 11, wherein said sharing the first dedicated memory comprises sharing the multiple instantiations of the at least one first process with multiple ones of the first buffers in the given stage of the data transfer pipeline.

13. The method of claim 12, additionally comprising transferring control of the multiple ones of the first buffers through the use of semaphores.

14. The method of claim 11, wherein the plurality of pipeline processes comprises a compression process and an encryption process.

15. The method of claim 11, additionally comprising storing data from the pool of second buffers to a storage device.

16. The method of claim 11, additionally comprising determining of a number of first buffers requested for allocation to one of the plurality of first processes.

17. The method of claim 16, additionally comprising terminating the one first process if the number of first buffers requested exceeds a threshold amount.

18. A pipeline system for providing data transfer between multiple computing devices, the pipeline system comprising:

means for compressing data being transferred from an origination computing device in a sequence of stages to a destination computing device with a data transfer pipeline that spans the origination computing device and the destination computing device, wherein the data transfer pipeline is identified on the origination computing device and the destination computing device with a data pipeline identifier;

first means for registering and controlling a plurality of first processes resident on the origination computing device, said first registering and controlling means residing on the origination computing device;

second means for registering and controlling a plurality of second processes resident on the destination computing device, said second registering and controlling means residing on the destination computing device;

first dedicated means for storing data, said first dedicated storing means residing on the origination computing device and being shared among the plurality of first processes registered on the origination computing device, wherein the first dedicated means for storing data comprises a first sequence of first buffers from a pool of first buffers, and wherein the first sequence of first buffers is associated with the data pipeline identifier until the first sequence of first buffers is freed;

second dedicated means for storing data, said second dedicated storing means residing on the destination computing device and being shared among the plurality of second processes registered on the destination computing device, wherein the second dedicated means for storing data comprises a second sequence of second buffers from a pool of second buffers, and wherein the second sequence of second buffers is associated with the data pipeline identifier until the second sequence of second buffers is freed; and means for initiating data transfer communications between the origination computing device and the destination device, and wherein at least one of said first and second registering and controlling means is further configured to register multiple instantiations of a particular process in a given stage of the sequence of stages, wherein the multiple instantiations are associated with the data pipeline identifier.

19. The pipeline system of claim 18, further comprising means for allocating a sequence of buffers from said first dedicated storing means, the sequence of buffers being locked against reallocation until freed by the particular process to which the sequence of buffers is assigned.

20. The pipeline system of claim 19, further comprising means for storing data resident in the sequence of buffers in the destination computing device and for freeing the sequence of buffers for reallocation.

* * * * *